Figure 1:
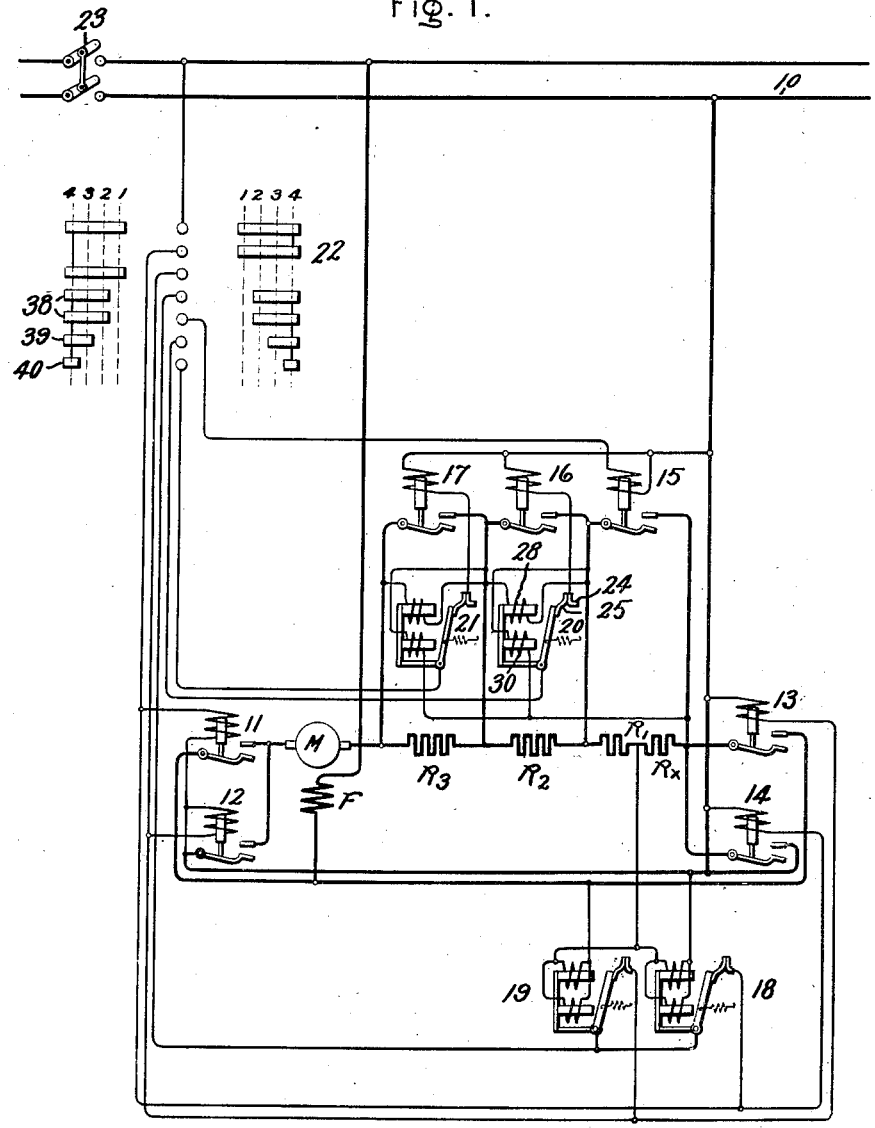

July 9, 1929.　　E. R. CARICHOFF ET AL　　1,720,623

MOTOR CONTROL

Original Filed Jan. 26, 1920　　7 Sheets-Sheet 1

Inventors:
Eugene R. Carichoff,
Benjamin W. Jones,
by Albert G. Davis
Their Attorney.

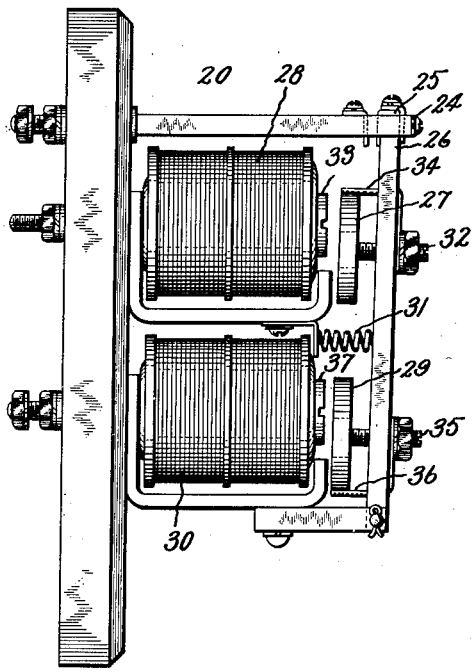
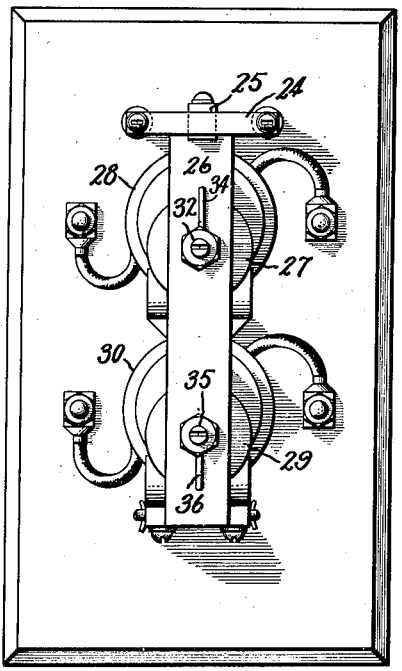

Inventors:
Eugene R. Carichoff,
Benjamin W. Jones,
by Albert G. Davis
Their Attorney Inventors:
Eugene R. Carichoff,
Benjamin W. Jones,
by
Their Attorney.

July 9, 1929.   E. R. CARICHOFF ET AL   1,720,623
MOTOR CONTROL
Original Filed Jan. 26, 1920   7 Sheets-Sheet 7

Inventors:
Eugene R. Carichoff,
Benjamin W. Jones,
by Albert G. Davis
Their Attorney.

Patented July 9, 1929.

1,720,623

UNITED STATES PATENT OFFICE.

EUGENE R. CARICHOFF AND BENJAMIN W. JONES, OF SCHENECTADY, NEW YORK, ASSIGNORS TO GENERAL ELECTRIC COMPANY, A CORPORATION OF NEW YORK.

MOTOR CONTROL.

Application filed January 26, 1920, Serial No. 527,520. Renewed January 6, 1922.

Our invention relates to the control of electric motors and it provides improved means whereby the motors may be started and stopped and generally controlled in a safe, reliable and efficient manner.

More specifically, our invention relates to the control of electric motors, wherein the motor is accelerated to full operating speed through a series of successive steps. It is common practice to provide resistors for limiting the amount of current taken by the motor during starting, and these resistors are cut out step by step until the motor is brought up to full operating speed. Various means have been heretofore provided for effecting this automatic cutting out of the starting resistance so that the current taken by the motor will not be in excess of a predetermined value, and whereby the motor may be brought up to full operating speed in as short a period of time as is consistent with safe operating conditions. It has been common practice to accelerate the motor step by step under the control of the motor current by means of current limit relays and the like. These relays are ordinarily provided with circuit making contacts which control the energization of the respective switches which short circuit the starting resistors as the motor speeds up. Systems of this character ordinarily involve the use of shunt contactors provided with interlocking disc contacts. These contacts are not entirely free from objection from an operating standpoint, especially if the control apparatus is so located that it may collect dust and dirt. A more recent development which avoids the use of these interlocking contacts is found in what is known as the series contactor system involving the use of contactors energized by the motor current which lock out when the motor current is high and close when the current drops to a proper value. Such a system does not, however, always give the complete control which may be desired. In its simplest form it is not fully under the control of the operator as well as under the control of the current. Furthermore, this system is not well adapted for use where the motor is required to run without load for a part of the time.

In carrying our present invention into effect, we take advantage of the voltage drop across the starting resistance which is proportional to the current flowing and which consequently diminishes as the motor accelerates due to the increasing counter-electromotive force of the motor. Systems of this general character have heretofore been proposed, but have not been commercially adopted largely because of the fact that they have not been so organized to meet practical operating conditions.

One of the objects of our invention is to provide a motor control having all of the advantages of systems wherein shunt contactors are used and systems wherein series contactors are used, and one which has none of the inherent disadvantages of those systems. The principles of our invention may be easily understood by an explanation of its operation in connection with the starting of a direct current motor, although it will be obvious from an understanding of our invention that it is not limited to the control of direct current motors, but may be easily adapted to the control of other types.

Figure 4:
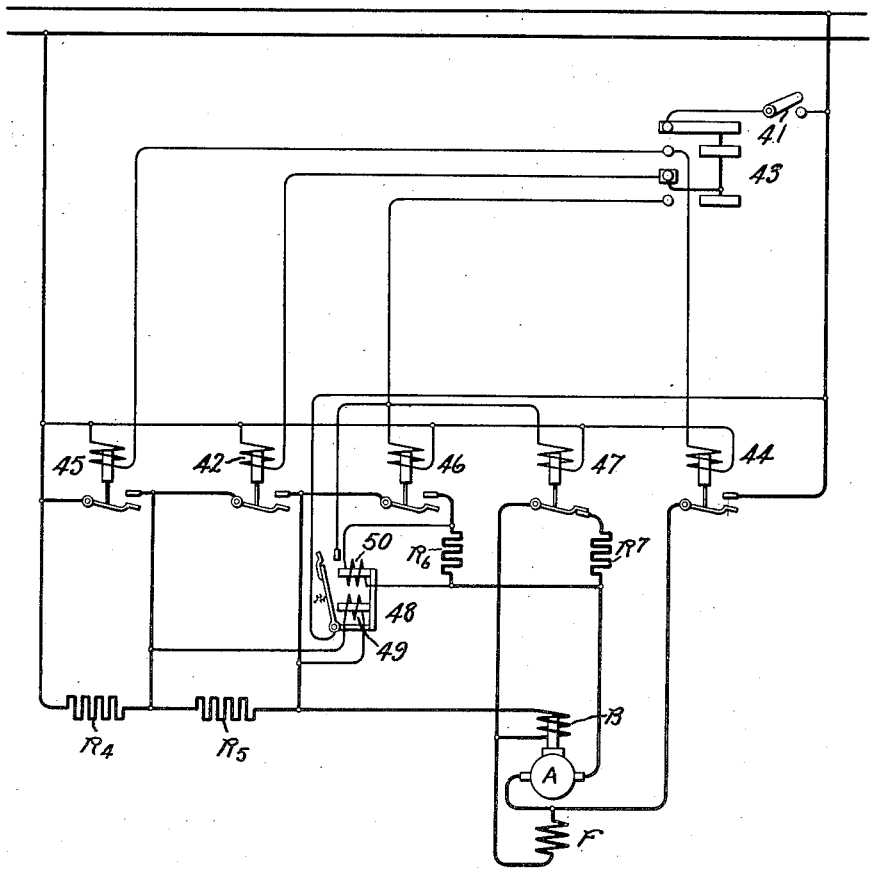
Figure 5:
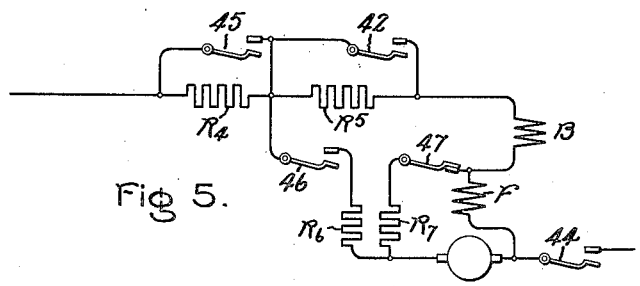

For a better understanding of our invention, reference is had to the accompanying drawings wherein Fig. 1 shows a system of control for a direct current motor embodying our invention; Figs. 2 and 3 show side and plan views respectively of a normally closed relay for controlling the energization of the electromagnetic resistance switches of the system of control shown in Fig. 1; Figs. 4 and 5 show simplified control diagrams of an arrangement in which the relay is of the normally open type; and Figs. 6 to 12 inclusive, show diagrammatically our invention embodied in various ways in systems of control for electric motors.

Referring to Fig. 1, the electric motor M having a series field F is energized from the source of supply 10 through reversing contactors 11, 12, 13 and 14, the pair of contactors 11 and 14 being provided for connecting the motor to the source for operation in one direction and the pair of contactors 12 and 13 for connecting the motor to the source for operation in the other direction. Resistance in the armature circuit of the motor for limiting the current taken by the motor at starting is provided. In the embodiment of our invention shown in Fig. 1, three sections $R^1$, $R^2$ and $R^3$ of the starting resistance are provided. The resistor $R^1$ is adapted to be short-circuited by means of the electromagnetic switch or contactor 15, the resistor $R^2$ by the contactor 16, and the resistor $R^3$ by means of the contactor 17. These resistance switches are controlled by means of electromagnetic switches or relays which are controlled responsively to the voltage drop across the starting resistance. The resistance contactors are therefore controlled responsively to the current taken by the motor, the arrangement being such that when the motor speeds up at starting and the current taken by the motor has decreased to a proper value the contactor 15 is energized to close and short circuit the section $R^1$, whereupon the motor current again rises. When the current again drops to the proper value the contactor 16 closes, followed by the contactor 17 when the motor speeds up and the current again drops. The normally closed relays 18 and 19 are provided for controlling the first resistance contactor 15, the normally closed relay 20 for controlling the contactor 16, and the normally closed relay 21 for controlling the contactor 17. A master controller 22 for controlling the starting, stopping and reversal of the motor is provided, and a line switch 23 is provided for controlling the connection of the motor and its control apparatus to the source of supply.

The relays 18 to 21 inclusive, which are shown very diagrammatically in Fig. 1, are shown in more detail in Figs. 2 and 3. Each of these relays is substantially identical in construction, although the windings of the relays 18 and 19 are connected in a different manner than are the windings of the relays 20 and 21. For purposes of explanation the relay 20 will be described. This relay comprises a stationary contact 24 and a movable contact 25 for controlling the energization of the coil winding of the contactor 16, the movable contact 25 being connected to the pivoted and movable member 26, to which the armature 27 of the upper coil 28 is connected and to which the armature 29 of the lower coil 30 is also connected. The member 26 carrying the contact 25 is biased to the unattracted position, that in which the contacts 24 and 25 make engagement, by means of the spring 31. In the embodiment of our invention shown in Figs. 1, 2 and 3, the relays are shown as being normally closed but our invention is not limited thereto as will be explained in connection with the arrangement of Fig. 4. The armature 27 is supported by a bolt 32 having a screw thread whereby the armature may be very nicely adjusted with respect to the core 33 of the electromagnet of which the winding 28 forms a part. A friction member 34 having a certain amount of resiliency is provided for retaining the armature 27 in the position to which it has been moved. The lower armature 29 is likewise mounted on a bolt 35 having a screw thread and a resilient friction device 36 for holding the armature in the position to which it has been adjusted with respect to the core 37 of the electromagnet of which the winding 30 forms a part. It will be observed that the magnetic structure of the upper electromagnet is substantially independent of that of the lower electromagnet and that the two electromagnets may be adjusted substantially independently of each other. The winding 28 of the upper electromagnet is connected across the second resistor $R^2$, and the winding 30 of the lower electromagnet is connected across the first resistor $R^1$.

The relays 18 and 19 are of similar construction to the relay 20, with the exception that the two independent electromagnets of the relay are connected in multiple so that they are energized and deenergized simultaneously. When the line switch 23 is closed, the two sets of relay windings are connected in series across the source of supply 10 and these relays are opened. When the master switch 22 is moved to the right so as to energize contactors 12 and 13 for motor operation in one direction, the windings of relay 19 are connected across a part of the starting resistance and the windings of relay 18 are connected across the remainder of the resistance and the motor armature, so that the relay 19 will close when the motor has speeded up and the motor current has decreased to a proper value. The electromagnetic resistance switch 15 is thereby energized to close to initiate the successive closing of the resistance switches as the motor increases in speed and the current taken by the motor decreases to the predetermined value. Likewise when the master controller 22 is turned to the left, the line contactors 11 and 14 are energized to close and the windings of relay 18 are connected across the same part of the resistance as were the windings of the relay 19, the windings of relay 19 in this instance being connected across the remainder of the resistance and the motor armature. The relay 18 will close responsively to the speeding up of the motor and effect the closing of the resistance switch 15. When the motor has been operating in one direction and the master controller 22 is thrown quickly through the off position to the other operative position, these relays 18 and 19 will prevent the resistance switches 15, 16 and 17 from closing until the current taken by the motor has been decreased to the predetermined value. The motor can therefore be "plugged," that is, reversed quickly by throwing the master switch quickly from the one operative position to the other, without serious injury to the motor, since when the master switch is thrown quickly from one operative position to the other, the starting resistance will all be reinserted in the motor armature circuit and this resistance will not be cut out until the motor armature current has dropped to a predetermined safe value.

As soon as the motor is connected to the source, there will be a voltage drop across the starting resistance and the relays 20 and 21 will automatically open, the pulls of the upper relay coils supplementing the pulls of the lower coils to effect the opening. The closing of resistance contactor 15 deenergizes the winding 30 of relay 20, and the closing of resistance switch 16 deenergizes the winding of the lower electromagnet of relay 21. These lower electromagnets are provided for effecting the opening of the relays, and the upper electromagnets are provided for governing the closing of the relays. Since the winding 28 of the upper electromagnet is connected across the resistor $R^2$, the one controlled by the relay, when the resistance contactor 15 closes, the opening coil 30 will be deenergized and the relay will be held in the open position by means of the winding 28 until the voltage drop across the resistor $R^2$ has decreased to such a value that the relay will close, thus energizing the resistance contactor 16 to close and short circuit the section $R^2$ of the starting resistance. The closing of the contactor 16 in a similar manner deenergizes the lower or opening coil of the relay 21 and permits this relay to close responsively to the voltage drop of the section $R^3$ of the resistance.

In our Patent 1,500,800, dated July 8, 1924, which has issued on an application which is a division of the present application, we have described and claimed specifically the features of construction and arrangement of the relays above described.

As thus constructed and arranged, and with the parts in the relative positions shown in Fig. 1, the operation of our invention is as follows:

In order to start the motor, the line switch 23 will first be closed, thereby connecting the set of windings of the relay 18 and the set of windings of the relay 19 in series across the supply circuit. These relays will therefore open against their bias to the closed position. The master switch 22 will then be moved, say for instance, to the right to its first operative position, thereby energizing the pair of reversing contactors 12 and 13 to close so as to connect the motor to the source of supply with all of the starting resistance in the motor circuit. When the contactors 12 and 13 close, the windings of relay 19 will be connected across the portion $R^x$ of the resistor $R^1$ and the windings of the relay 18 will be connected across the remainder of the resistance and the motor armature. The closing of the motor circuit will effect the opening of the normally closed relays 20 and 21, since the lower or opening coil 30 of the relay 20 is energized responsively to the voltage drop across the resistor $R^1$, and the upper or closing coil 28 is energized responsively to the drop across the resistor $R^2$. The lower or opening coil of the relay 21 is energized responsively to the drop across the resistors $R^1$ and $R^2$, and the upper or closing coil is energized responsively to the voltage drop across the resistor $R^3$. As soon as the motor current drops due to the speeding up of the motor, the voltage drop across the section $R^x$ will diminish to such a value that the relay 19 will close its contacts in accordance with its bias. The resistance contactor 15 will not be closed, however, until the master controller is moved to its second operative position, thereby completing a circuit for the coil winding of the contactor 15 through the contacts of the relay 19 and the segments 38 of the master controller. The closing of the contactor 15 will deenergize the lower or opening coil 30 of the relay 20, but this relay will not close since it is held in the open position by means of the upper or closing coil 28. As soon as the voltage drop across the section $R^2$ of the resistance has decreased to such a value that the winding 28 will not hold the relay in its open position against its bias to the closed position, the relay will automatically close its contacts. The contactor 16 will not be energized to close, however, until the master controller is moved to the third operative position, thereby energizing the coil winding of the contactor 16 through the contacts 24 and 25 of the relay 20, the segment 39 of the master switch and the contacts of relay 19. The closing of contactor 16 will deenergize the lower or opening coil of the relay 21, and this relay will be held in the open position by means of the upper or closing coil, so that when the voltage drop across the section $R^3$ of the starting resistance has decreased to the predetermined value, the relay 21 will close its contacts in accordance with its bias. The contactor 17 will not be closed until the master switch has been moved to the fourth operative position so that the coil winding of the contactor 17 may be energized from the source of supply through the contacts of the relay 21, the segment 40 of the master switch and the contacts of relay 19.

If desired, the master switch 22 can be at once thrown directly to the fourth operative position and the resistance contactors will be automatically closed in succession responsively to the speeding up of the motor and the voltage drop across the starting resistance. The automatic closing of the resistance contactors can be arrested at any time by moving the controller backward to either the third, second or first operative position of the controller. For instance, the master controller is first thrown to the fourth position and the automatic cutting out of the resistance has proceeded until the contactor 16 has closed; if the controller is moved backward to the second position, the successive closing of the contactors will be arrested, the contactor 16 will be opened, but the contactor 15 will be maintained closed.

In case the master controller 22 is first thrown to the left, the windings of relay 18 will be connected across the part $R^x$ of the starting resistance $R^1$ and the windings of the relay 19 will be connected across the remainder of the resistance to the motor armature. When the voltage drop across the part $R^x$ has decreased to the predetermined value, the relay 18 will close to initiate the automatic cutting out of the starting resistance in the same manner as described in connection with the relay 19 when the controller was moved from its off position toward the right. It will be understood, of course, that when the master controller is moved to the left, the pair of reversing contactors 12 and 13 will be deenergized and the pair 11 and 14 will be energized to connect the motor to the source for operation in a different direction than that occasioned by the closing of the contactors 12 and 13. If the master controller has been thrown to the fourth or full running position to the right and it is desired that the motor be quickly reversed, this may be done by throwing the master controller quickly to the fourth or full running position to the left. The pair of contactors 12 and 13 will thereupon be opened, the resistance contactors will all be automatically opened, the relays will all be opened, and the pair of reversing contactors 11 and 14 will be closed. The motor will then be connected to the source for operation in the reverse direction with all of the starting resistance included in the motor circuit. This is called "plugging" the motor, and it will cause no damaging effects on the motor since all of the starting resistance has been included in the motor armature circuit so as to cut down the rush of current. When the current in the motor armature circuit has decreased to the predetermined value, the relay 18 will close its contacts to initiate the successive operation of the resistance contactors in the manner previously explained.

It will be observed that the magnetic circuits of the relay coils are indepentent of each other and that the relays 18 to 21 inclusive are all capable of a wide range of adjustment. The values at which the relays will open and close may be varied independently of each other, and this wide range of permissible adjustment makes the relay suitable for almost all kinds of service to which electric motors are applied. It will also be noted that the same relay and coils may be used for all sizes of motors of substantially the same voltage, thereby effecting a simplication and reduction of the cost of control equipments and necessitating the carrying of very few spare parts in stock. Since there are no interlocking contacts, a great many operating troubles are eliminated, the wiring is very simple, and less time and labor will be required in building a control equipment. The relays have no mechanical connection with the resistance contactors and may be located in any desirable place, or may be locked up away from unauthorized persons and away from dirt. The contact parts of the relay are vertical and will thus retain a minimum amount of dirt. It will be observed that with our arrangment the advantages of the series contactors systems are retained as well as the advantages of the shunt contactor systems. The relays, when of the normally closed type, are never called on to break a circuit and thus may be made quite simple and inexpensive, since the closing of a circuit is relatively simple as compared to breaking a circuit, especially an inductive circuit. Because of that fact, the movement of the relay contacts may be anything desired, and the pick-up and drop-out values of the relay may be adjusted without regard to the distance which separates the contacts when the relay is open. Because of the wide range of permissible adjustment, either one of the relay coils may be connected so as to assist in effecting the opening of the relay or be connected as the coil which governs the closing of the relay. Since both relay coils are deenergized when the resistance contactor controlled by the relay closes, there is no tendency to open the relay or to diminish the pressure on the relay contacts due to the increase in current when the resistance is cut out.

A further important advantage of our invention is that a time limit characteristic in cutting out the starting resistance may be had as well as a current limit characteristic. Thus, when the coil 30 of relay 20 is short-circuited by the closing of the resistance switch 15, the coil is not instantly deenergized because of its inductive effect, and the armature 29 will therefore be maintained in the attracted position for an appreciable interval of time. This time interval may be varied by varying the position of the armature 29 on the threaded bolt 35, since the nearer the armature to the core of the electromagnet, the longer the armature will be held by the magnetization after the coil has been shunted.

A still further important advantage of our invention is that in case any one of the resistance contactors should freeze, it would affect only that section of resistance and not cause the motor to be connected practically directly to the source. Thus, assume that the contact tips of contactor 15 are accidentally welded shut and that the controller 22 is turned to the right so that the coils of relay 19 are connected across the portion $R^x$ of the starting resistance. The relay 20 will have its coil 30 short-circuited by the contactor 15, but the rush of current will be such that the voltage drop across the resistor $R^2$ will energize the coil 28 to open the relay contacts. The relay 21 will open in the usual way, but none of the resistance switches will be energized to close until after the relay 19 closes, whereupon the contactor 16 will next close when the relay 20 closes, and the cutting out of the resistance will proceed in the manner explained.

In the arrangement shown in Figs. 4 and 5 we have shown our invention embodied in an arrangement in which the electromagnet switch or relay for controlling the resistance in the motor circuit for varying the motor speed is of the normally open type. The arrangement of Figs. 4 and 5 is a simplified diagram of connections of a control for a hoisting motor, and for purposes of easy understanding of our invention only the lowering connections are shown. When the pilot switch 41 is closed the resistance contactor 42 is energized to close, since the winding of this coil will be energized through the contacts of the master switch 43 when the master switch is in the off position. The contactor 42 in closing short circuits the section of resistance $R^5$. When the master switch is moved to the left to its next operative position, the line contactor 44 and the resistance contactor 45 are energized to close, thereby connecting the motor to the source of supply with the series field F of the motor connected in a shunt to the motor armature with the coil B of the electromagnet brake energized so as to release the brake. The contactor 42 in this position is deenergized and the resistance $R^5$ is included in the motor circuit. The contactor 46 is also energized to include the motor armature in series with the resistance $R^6$ in a shunt circuit to the series field F and brake coil B connected in series. The normally closed contactor 47 will also be energized to open. The relay 48 will be energized to close its contacts, since the lower coil 49 is connected across the resistance $R^5$ and the upper coil 50 is connected across the resistance $R^6$. The relay, therefore, will be energized to close its contacts against its bias to the open position and establish a maintaining circuit for the windings of contactors 46 and 47 so as to maintain the contactors 46 closed and the contactors 47 open independently of the master switch 43. With the motor running, if the master switch is now turned to its off position, the line contactor 44 will be deenergized and open, and the resistance contactor 45 will also be deenergized and open its contacts. The resistance contactor 42 will now be energized to close and short circuit the resistance $R^5$, thereby deenergizing the lower coil 49 of the relay 48. The relay will be maintained closed for an interval, since the upper or drop-out coil 50 is connected across the resistance $R^6$ so that the contactors 46 and 47 will remain energized even though the master switch has been returned to its off position. The motor will now be included in a local dynamic braking circuit which includes the motor armature A, the resistance $R^6$, contactor 46, the brake coil B and the series field F. The brake will thereby be maintained released until the motor has materially decreased in speed and the voltage drop across the resistance $R^6$ has decreased to such a value that the relay 48 will open its contacts in accordance with its bias. When the speed of the motor has decreased to such value, the relay 48 in opening will deenergize the contactors 46 and 47, thereby deenergizing the brake coil B, applying the brake and connecting the motor in a local dynamic braking circuit which includes the motor armature A, the resistance $R^7$ and the series field F. The resistance $R^7$ is of such a value that the motor will be quickly brought to rest, and the dynamic braking effect is supplemented by the braking effect of the electromagnet brake B.

It will be observed that the relay 48 is of the normally open type, but that its principle of operation is the same as the normally closed relays which we have fully described in connection with Figs. 1 to 3 inclusive. In both cases the relay is moved against its bias to one position by means of the two coils, each of which is connected across a resistor for controlling the speed of the motor, and that when one of the coils is de-energized by the short circuiting of one of the resistors, the relay will move in accordance with its bias to its original position responsively to the energization of the other coil.

From the description of our invention which has been previously given, it is believed that a complete understanding of the embodiment of our invention as disclosed in Figs. 6 to 10 inclusive will be understood from a description of the operation of the arrangements.

Figure 6:
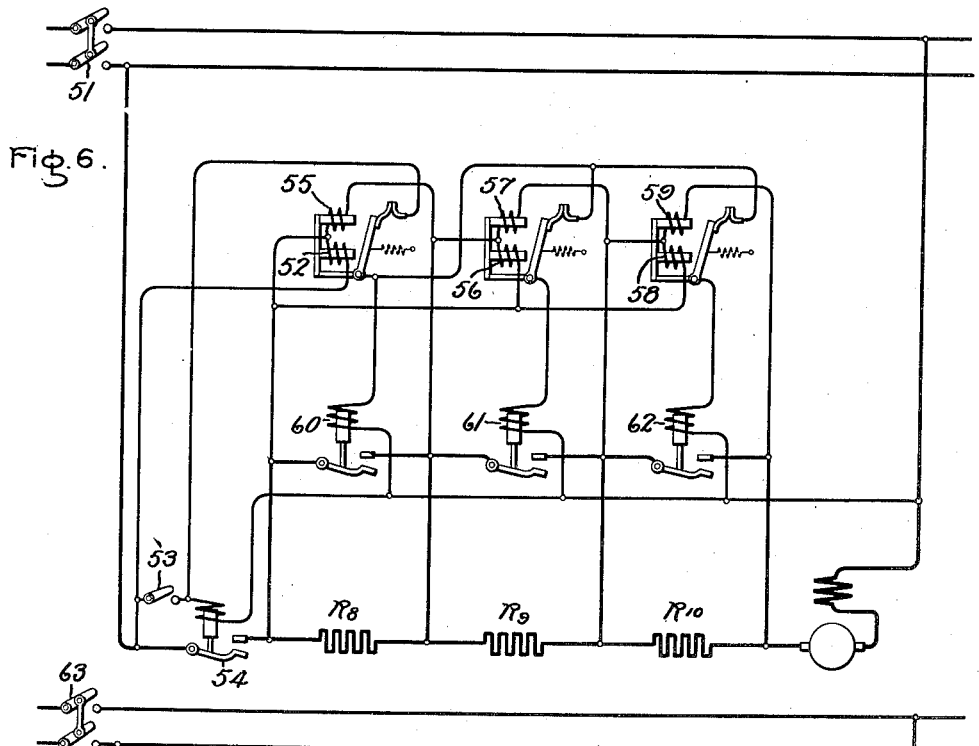

Referring to Fig. 6, the closing of the manually operated disconnecting switch 51 connects the winding 52 of the first relay across the source of supply and causes this relay to open its contacts. Upon the closing of the pilot switch 53, the electromagnet line switch 54 is energized to close its contacts and connect the motor to the source of supply with the resistors $R^8$, $R^9$ and $R^{10}$ in series with the motor. The winding 55 of the first relay will thereupon be energized responsively to the voltage drop across the resistor $R^8$ to maintain this relay open temporarily, although the winding 52 has been short circuited by the closing of the line contactor 54. The closing of the line contactor 54 also energizes the winding 56 of the second relay responsively to the voltage drop across the resistor $R^8$, the winding 57 of the second relay responsively to the voltage drop across the resistor $R^9$, the winding 58 of the third relay responsively to the voltage drop across the resistors $R^8$ and $R^9$, and the winding 59 of the third relay responsively to the voltage drop across the resistor $R^{10}$. The second and third relays will thereby be energized to open their contacts in response to the closing of the line contactor 54. When the current taken by the motor has decreased to the proper value, the energization of the winding 55 of the first relay will be such that this relay will be permitted to close its contacts in accordance with its bias and thereby energize the contactor 60 to close and short circuit the resistor $R^8$ and the "pick-up" winding 56 of the second relay. The shunting of the winding 56 of the second relay permits this relay to be governed in closing by the "drop-out" winding 57 which is now energized responsively to the voltage drop across the resistor $R^9$. When the second relay closes automatically, due to the decrease in current taken by the motor, the second resistance contactor 61 is energized to close and short circuit the resistor $R^9$ and the "pick-up" winding 58 of the third relay. This third relay is permitted to automatically close its contacts when the motor current has again dropped to the proper value and will be governed in closing by the energization of the "drop-out" winding 59. The third relay in closing will complete the winding circuit for the contactor 62 and thereby short circuit the resistor $R^{10}$ and connect the motor directly to the source of supply.

Figure 7:
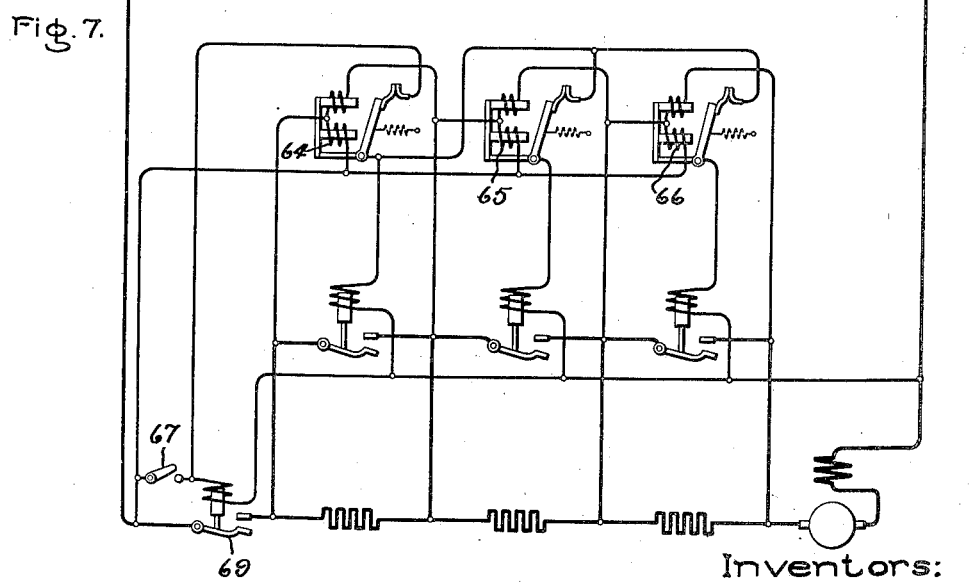

The arrangement of Fig. 7 is substantially the same as that of Fig. 6, with the exception that the closing of the manually operated disconnecting switch 63 will complete the circuit for the "pick-up" windings 64, 65 and 66 of the first, second and third relays respectively. These relays will be caused to open against their bias to the closed position. In all other respects the operation of this arrangement is same as that of Fig. 6. The closing of the pilot switch 67 will energize the line contactor 69 to close and thereby short circuit the winding 64 of the first relay. The motor will be automatically accelerated to full operating speed in the same manner as that of Fig. 6. In Fig. 6, with the disconnecting switch 51 maintained closed, the motor will be disconnected from the source of supply by the opening of the pilot switch 53, at which time the second and third relays will remain in their closed position, but the first relay will be energized to open its contacts in response to the opening of the line contactor 54. In the arrangement of Fig. 7, with the disconnecting switch 63 maintained closed, the opening of the pilot switch 67 will disconnect the motor from the source of supply and automatically energize all three of the relays to open their contacts. The arrangement of Fig. 6 has an advantage over the arrangement of Fig. 7 in that when the pilot switch 53 is opened to disconnect the motor from the source of supply, only the first relay is energized to open its contacts, whereas in the arrangement of Fig. 7 the opening of the pilot switch 67 causes all three of the relays to be energized and open their contacts.

Figure 8:
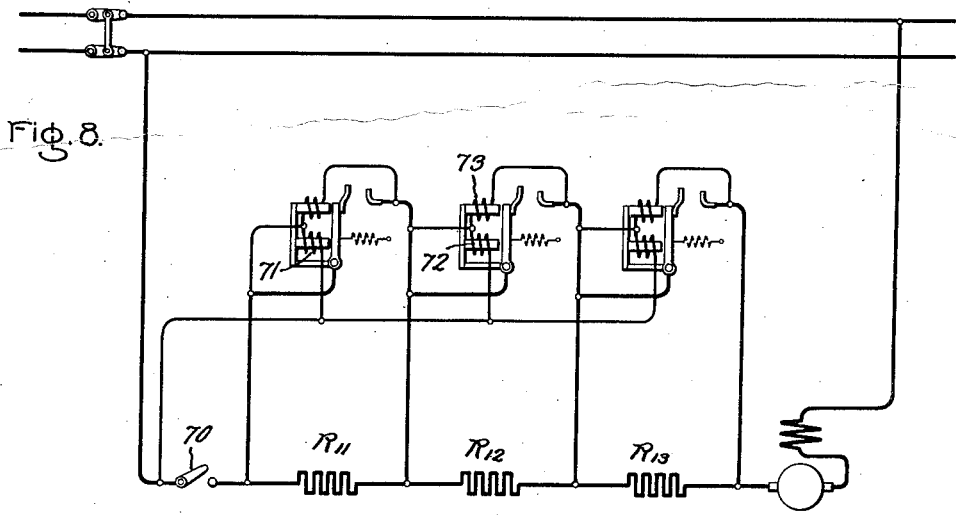

In the arrangement of Fig. 8, the relays heretofore described take the form of electromagnetic switches which directly short circuit the starting resistors instead of through the medium of electromagnetic switches or contactors as in the previous arrangements. In this arrangement, the closing of the manually operated switch 70 connects the motor to the source of supply with the resistors $R^{11}$, $R^{12}$ and $R^{13}$ in the motor circuit to limit the current taken by the motor in starting. The closing of the switch 70 short circuits the "pick-up" winding 71 of the first electromagnet switch and permits this switch to close its contacts responsively to the voltage drop across the resistor $R^{11}$. The closing of the first electromagnet switch short circuits the "pick-up" winding 72 of the second electromagnet switch and permits this switch to be closed responsively to the energization of the "drop-out" winding 73 which is energized responsively to the voltage drop across the resistor $R^{12}$. The closing of the second electromagnetic switch likewise causes the third electromagnetic switch to close in accordance with its bias to the closed position, responsively to the voltage drop across the resistor $R^{13}$. The opening of the switch 70 causes the opening of all of the electromagnetic resistance switches, since the lower, or "pick-up" windings are all energized in multiple across the contacts of switch 70. The parts will then be in the position shown in the drawing.

Figure 9:
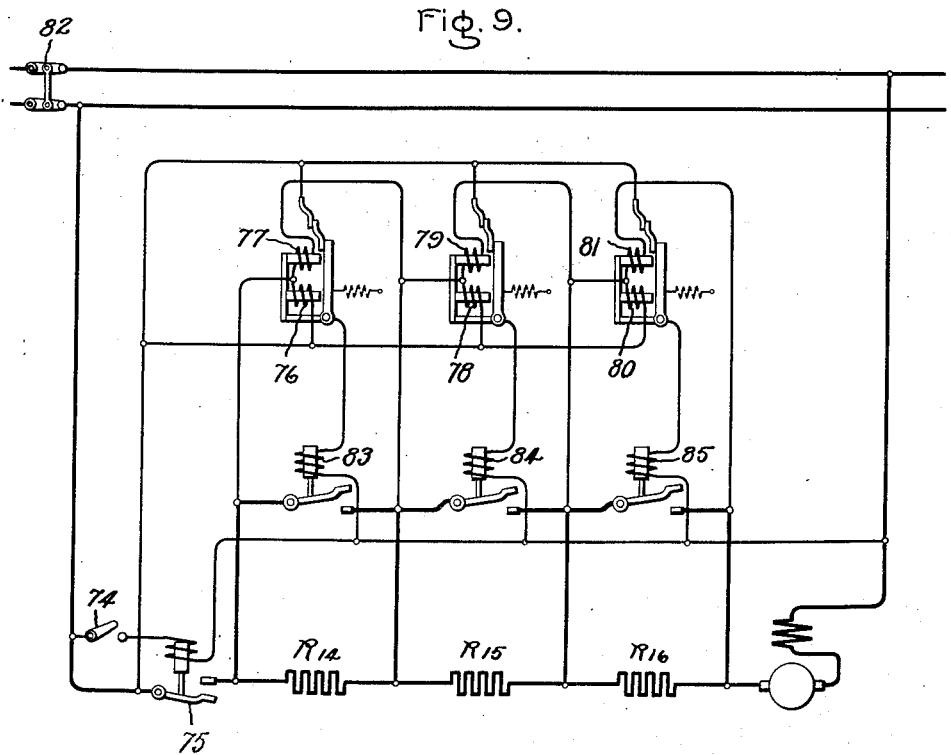

In the arrangement of Fig. 9, the electromagnet switches or contactors which control the starting resistors are of the normally closed type, and the electromagnet relays for controlling these starting contactors are of the normally open type. With the parts in the positions shown in the figure, the closing of the pilot switch 74 energizes the line contactor 75 to close and connect the motor to the source of supply with the starting resistors $R^{14}$, $R^{15}$, $R^{16}$ included in the motor circuits to limit the current taken by the motor at starting. The closing of the line contactor 75 short circuits the "pick-up" winding 76 of the first relay and energizes the "drop-out" winding 77 of this relay responsively to the voltage drop across the resistor $R^{14}$. The winding 78 of the second relay will be energized responsively to the voltage drop across the resistor $R^{14}$, the winding 79 will be energized in accordance with the voltage drop across the resistor $R^{15}$, the winding 80 will be energized in accordance with the voltage drop across the resistor $R^{15}$, and the winding 81 will be energized in accordance with the voltage drop across the resistor $R^{16}$. It will be observed that with the manually operated disconnecting switch 82 closed and the line contactor 75 open, as shown in the drawing, the relays controlling the resistance contactors are all energized to close their contacts against their bias to the open position, and the resistance contactors are energized to open their contacts against their bias to the closed position. When the current taken by the motor has decreased to the predetermined value, the energization of the winding 77 of the first relay will be such that this relay will be permitted to open its contacts in accordance with its bias to the open position and thereby de-energize the winding of the resistance contactor 83, permitting this contactor to close its contacts to short circuit the resistor $R^{14}$ and the winding 78 of the second relay. The windings of the resistance contactors 84 and 85 will be de-energized in succession to short circuit the resistors $R^{15}$ and $R^{16}$ in succession in a manner which will be obvious to those skilled in the art from the description of the other modifications of our invention.

Figure 10:
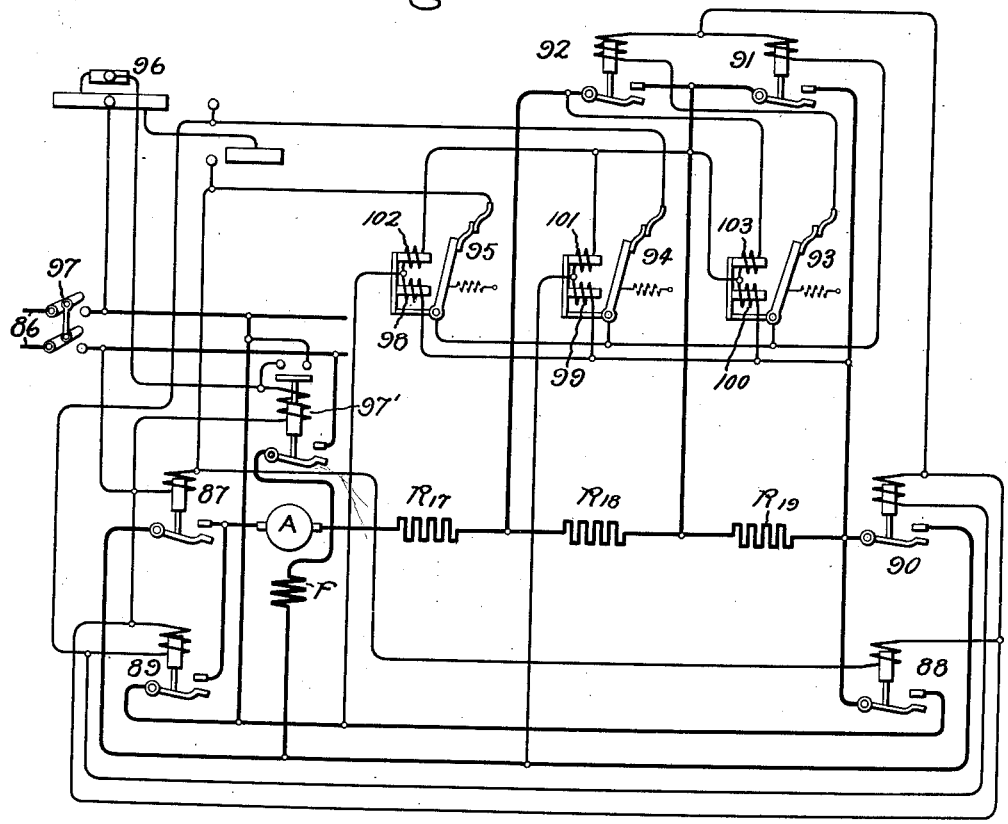

In the arrangement of Fig. 10, the electric motor having an armature A and series field F is adapted to be connected to the source of supply 86 through the line contactors 87 and 88 for one direction of operation and through the line contactors 89 and 90 for the other direction of operation. Resistors $R^{17}$, $R^{18}$ and $R^{19}$ are provided for limiting the current taken by the motor at starting and when the motor is reversed from one direction of operation to operation in the other direction. The contactor 91 is provided for short circuiting the resistor $R^{19}$ and the contactor 92 is provided for short circuiting the resistor $R^{18}$. The relay 93 is provided for controlling the winding of the contactor 92, and the relays 94 and 95 are provided for controlling the winding of the contactor 91 and also the winding of contactor 92, as will be later explained. The motor is controlled through the contactors and relays by means of a master controller 96.

As thus constructed and arranged, and with the parts in the position shown in the drawing, the operation of this embodiment of our invention is as follows: The disconnecting switch 97 will first be closed, and the no-voltage protective contactor 97' will be energized to close and establish a maintaining circuit for its winding through its upper auxiliary contact. The winding 98 of the relay 95 and the winding 99 of the relay 94 will thereby be energized in series across the source of supply through a circuit which includes the series field F of the motor. The "drop-out" coil 102 of relay 95 and the "drop-out" coil 101 of relay 94 are also energized in series across the source of supply. The relays 94 and 95 will thereby be energized to open their contacts against their bias to the closed position. Moving the master switch 96 to the right to its operative position will energize the windings of the contactors 89 and 90 from the source of supply, thereby completing the circuit for the motor through the resistors $R^{17}$, $R^{18}$ and $R^{19}$. As soon as the contactors 89 and 90 close, there will be a voltage drop across the resistor $R^{19}$ which will be such that the winding 100 of the relay 93 will be energized to open this relay against its bias to the closed position. Winding 103 will be energized in accordance with the voltage drop across $R^{18}$. The closing of the contactor 90 short circuits the winding 99 of the relay 94, but this relay will be maintained open since the winding 101 of the relay is now connected across the resistor $R^{19}$ and will therefore be energized responsively to the voltage drop across this resistor. The relay 95 will also be maintained open, since full line voltage will be applied to the winding 98 of this relay, and the upper winding 102 of this relay will be connected across the motor armature and the resistors $R^{17}$ and $R^{18}$ in series. When the current drops to the predetermined value due to the speeding up of the motor, the voltage drop across the resistor $R^{19}$ will be such that the energization of the winding 101 will not be sufficient to maintain the relay 94 open against its bias to the closed position, and this relay will close and thereby energize the winding of the contactor 91 across the source of supply. The contactor 91 in closing short circuits the resistor $R^{19}$ and the winding 100 of the relay 93. This relay 93 will, however, be maintained open for an interval for the reason that its upper or "drop-out" coil winding 103 is energized responsively to the voltage drop across the resistor $R^{18}$. As soon as the current taken by the motor again drops to the predetermined value, the energization of the winding 103 will be such that the relay 93 will be permitted to close, thereby energizing the winding of the contactor 92 across the source of supply. The contactor 92 in closing short circuits the resistor $R^{18}$. If now the master switch 96 be turned to the left through its off position to its left-hand operative position, contactors 89, 90, 91 and 92 will open, and contactors 87 and 88 will close. The opening of contactors 89 and 90 puts half line voltage on each of the windings of relays 94 and 95, and relay 94 will open but the opening of this relay will have no effect for the time being, since the resistance contactors 91 and 92 were opened when the controller is moved through the off position. The relay 95 will be maintained open while the master switch 96 is thrown from one position to the other, since half line voltage is applied to both coils of the relay. In the left-hand operative position of the master switch 96, the contactors 87 and 88 will be closed to connect the motor to the source of supply with the direction of the current through the motor armature reversed. The closing of the contactor 88 short circuits the winding 98 of the relay 95, but this relay is maintained open due to the energization of its winding 102 which is now energized responsively to the voltage drop across the resistor $R^{19}$. The relay 94 will also be maintained open, since full line voltage is applied to its winding 99, and the winding 101 is energized responsively to the voltage drop across motor armature and the resistors $R^{17}$ and $R^{18}$. The resistors $R^{17}$, $R^{18}$ and $R^{19}$ will offer sufficient resistance so that the motor can be directly reversed from one direction of operation to the other, and the current taken by the motor will not be excessive. When the current taken by the motor has dropped to the predetermined value, the relay 95 will close its contacts, thereby energizing the contactor 91 to close and short circuit the resistor $R^{19}$ and the winding 100 of the relay 93. The relay 93 will therefore be governed in closing responsively to the voltage drop across the resistor $R^{18}$. When this voltage drop has decreased to the predetermined value, the relay will close its contacts and energize the contactor 92 to close and short circuit the resistor $R^{18}$, thereby bringing the motor up to full operating speed for this direction of operation. If the master switch 96 is now thrown from its left-hand position to its right-hand position, the resistance contactors 91 and 92 will open, the line contactors 87 and 88 will open, the line contactors 89 and 90 will close, and the relay 94 will function to prevent the resistors $R^{18}$ and $R^{19}$ being short circuited until the current taken by the motor has dropped to the predetermined value. By means of our arrangement, the master switch can be thrown quickly from one operative position to the other and the motor will be reversed without taken an excessive or damaging current from the source of supply. The arrangement of this Fig. 10 is in certain respects similar to the arrangement of Fig. 1, with the exception that it is simpler and in that it does not provide the same degree of manual control of the motor as the arrangement of Fig. 1. If the power should fail while the motor is running, the contactor 97' will be deenergized and the controller 96 must be returned to the off position before the motor can be again started.

In the arrangements which have heretofore been described, with the exception of Fig. 10, a failure of voltage with the line disconnecting switch closed is apt to cause the resistance contactors and the line switch to be closed simultaneously upon a resumption of power. For the sake of an easy understanding of our invention means have not been shown for taking care of this feature in any of the figures except Fig. 10.

We will now describe another scheme in which this condition is taken care of, and it will be understood by those skilled in the art that the arrangement shown is intended to be merely illustrative of the manner in which the condition can be taken care of and that the protection may be afforded by other means.

Figure 11:
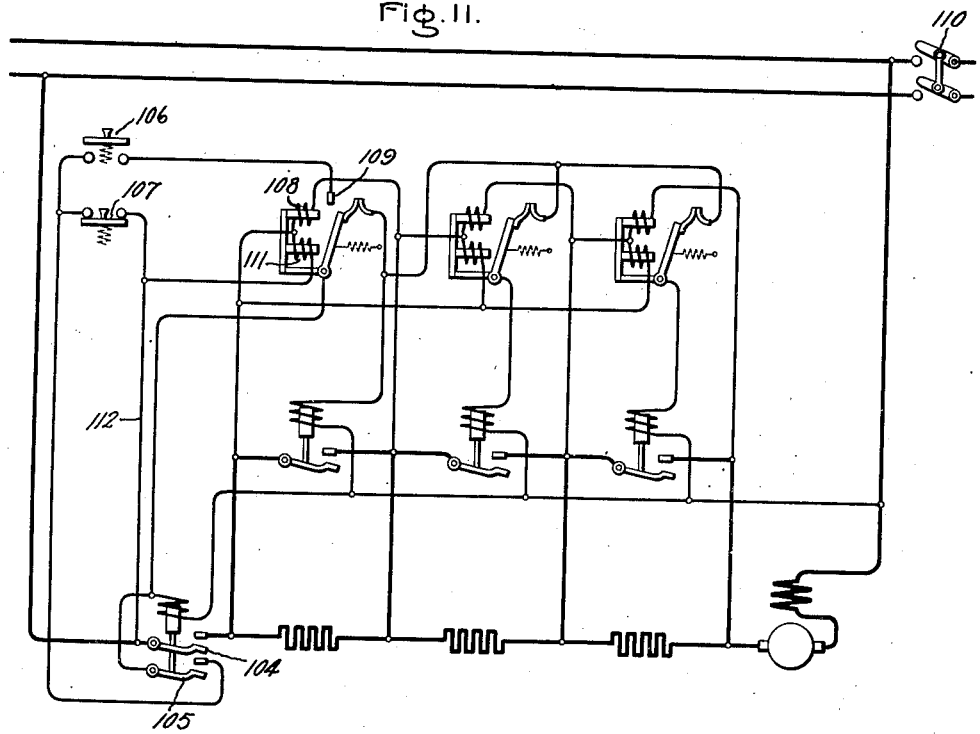
Figure 12:
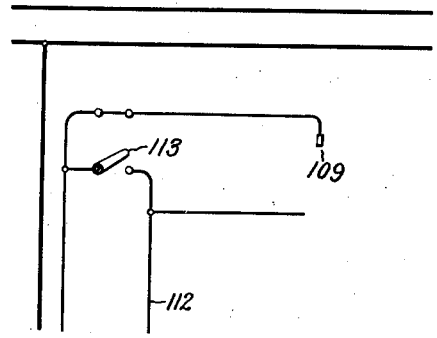

Referring to Figs. 11 and 12, it will be observed that in Fig. 11 we have shown substantially the same arrangement as that of Fig. 6, with the exception that means are provided for taking care of a failure of power. In Fig. 6 if the disconnecting switch 51 is closed, pilot switch 53, the line contactor 54 and the relays and the resistance contactors are closed, the motor being connected directly across the line, in case there is a failure of power, the line contactor 54, as well as the other electromagnetic switches and relays, will all be permitted to assume the position shown in the drawing. If the delivery of power is resumed, there is a possibility of the resistance contactors 60, 61 and 62 being energized to close before or at the same time as the line contactor 54 is energized to close. If this happens, the closing of the line contactor 54 will connect the motor directly across the source of supply and an excessive current will be taken by the motor if the speed of the motor has very materially decreased. The arrangement of Fig. 11 is intended to take care of such a condition.

It will be noted that we have provided a push button control arrangement and that the line contactor 104 is provided with an auxiliary contact 105. A normally open push button 106 is provided for effecting the starting of the motor, and a normally closed push button 107 is provided for effecting the stopping of the motor. The relay 108 has a stationary contact 109 connected with a terminal of the start push button 106. As thus constructed and arranged the operation of this feature of our invention is as follows:

The disconnecting switch 110 will first be closed, thereby energizing the lower or pick-up coil 111 of the relay 108. In the attracted position, the relay will make contact with the contact 109. If, now, the start push button 106 is closed, the electromagnetic line contactor 104 will be energized to close, the circuit being through the conductor 112, the stop push button 107, start push button 106, contact 109 of the relay 108, through the winding of the contactor to the other supply conductor. The line contactor in closing completes the circuit through the auxiliary contacts 105 and establishes a holding circuit for the winding of the line contactor through the contacts 105 and the stop push button 107, so that the start push button 106 may be released and the line contactor will remain closed. The electromagnet resistance contactors will be energized to close in succession in the same manner as that described in connection with Fig. 6, and it is believed that further description is unnecessary.

Assume that the resistance contactors are closed and the motor is connected directly across the source and that the power should fail, the line contactor 104 as well as the resistance contactors and accelerating relays, will all assume the position shown in the drawing. If, now, there should be a resumption of power, the line contactor is prevented from closing, since the holding circuit through the auxiliary contacts 105 is broken and the circuit through the start push button 106 is also open. The motor will, therefore, not be started until the operator closes the start push button 106.

In Fig. 12 we have shown a fragment of a control arrangement in which a pilot switch is used instead of the push button arrangement as shown in Fig. 11. This amounts to nothing more than shorting the contacts of the start push button 106 and providing the pilot switch 113 instead of the stop push button 107.

When the pilot switch 113 is moved to the circuit closing position, the winding of the line contactor 104 will be energized through the contact 109 and the movable contact of the relay 108, so that in case there should be a failure of voltage and the relay 108, as well as the other relays and the line contactor 104, return to their biased positions, the line contactor cannot be reclosed until the relay 108 has been energized to operate and make engagement with the contactor 109. This will prevent the resistance contactors from being closed before the line contactor is closed.

In order to show the very great adaptability of our invention to numerous uses we have shown our invention embodied in a few arrangements for the control of an electric motor but it will be obvious to those skilled in the art from an understanding of our invention that our invention is by no means limited in its application to the particular arrangements shown. The particular arrangements shown have been selected with the principal object in mind of imparting quickly to others an understanding of the invention and with the object of suggesting the manner in which the invention can be applied to various uses.

In accordance with the provisions of the patent statutes, we have described the principle of operation of our invention, together with the apparatus which we now consider to represent the best embodiment thereof; but we desire to have it understood that the apparatus shown is only illustrative and that the invention can be carried out by other means.

What we claim as new and desire to secure by Letters Patent of the United States, is:—

1. A control system for electric motors comprising a resistor for controlling the motor, an electromagnetic switch for controlling the resistor, the said switch having two windings, one of which is connected across the resistor and means whereby the switch is opened under the control of the other winding and subsequently closed under the control of the first winding.

2. A control system for electric motors comprising a resistor for controlling the motor, an electromagnetic switch for controlling the resistor, the said switch having two windings, one of which controls the opening of the switch and the other of which is connected across the resistor and governs the closing of the switch, and means controlled by the first of said windings whereby after the switch is opened the closing of the switch is placed under the control of the second winding.

3. A control system for electric motors comprising a resistor for controlling the motor, an electromagnetic switch for controlling the resistor, the said switch having two windings, one of which controls the opening of the switch and the other of which is connected across the resistor and governs the closing of the switch, and means whereby the first of said windings is controlled so that the switch is opened and the closing of the switch is placed under the control of the second winding.

4. A control system for electric motors comprising a resistor for controlling the motor, an electromagnetic switch having a switch member biased to one position for controlling the resistor, the said switch having two windings, one of which is connected across the resistor and governs the operation of the switch member to its biased position, and means controlled by the other winding whereby the switch member is moved to another position against its bias and the movement of the switch member to its biased position is placed under the control of the first winding.

5. A control system for electric motors comprising a resistor for controlling the motor, an electromagnetic switch for controlling the resistor, the said switch having two windings, one of which controls the opening of the switch and the other of which is connected across the resistor and controls the closing of the switch, and means whereby the energization of the first of said windings is controlled so that after being opened the switch is placed under the control of the second winding and automatically closed when the motor current has dropped to a predetermined value.

6. A control system for electric motors comprising a resistor for controlling the motor, an electromagnetic switch for controlling the resistor, the said switch having one winding connected across the resistor and another winding which operates to place the switch under the control of the first winding, means controlled by the second winding for opening the switch, and means whereby the windings are energized in response to the closing of the motor circuit and the switch is closed under the control of the first winding responsively to the voltage drop across the resistor.

7. A control system for electric motors comprising a resistor for controlling the motor, an electromagnetic switch having a switch member biased to the closed position for controlling the resistor, the said switch having two windings, one of which is connected across the resistor and governs the closing of the switch and the other of which controls the opening of the switch and operates to place the switch under the control of the first winding after the switch is opened, and connections whereby both windings are energized in response to the closing of the motor circuit and the switch member is closed in accordance with its bias responsively to the voltage drop across the resistor.

8. A control system for electric motors comprising a resistor for controlling the motor, an electromagnetic switch for controlling the resistor, a relay for controlling the resistor switch, the said relay having two windings, one of which is connected across the resistor, means controlled by the second of said windings for opening the relay and for giving the control of the closing of the relay to the first winding, and connections whereby both relay windings are energized in response to the closing of the motor circuit and the relay is closed to energize the resistor switch to close responsively to the voltage drop across the resistor.

9. A control system for electric motors comprising a resistor for controlling the motor, an electromagnetic switch for controlling the resistor, the said switch having two windings, one of which is connected across the resistor, means controlled by the other of said windings for opening the switch, and means for short circuiting the second winding so as to give the control of the closing of the switch to the first winding after at definite interval of time.

10. The combination in a system of motor control of a plurality of resistors for controlling the motor, a normally closed electromagnetic switch for controlling each of said resistors, each of said switches having a coil connected across a resistor for governing the closing of the switch and a coil for governing the opening of the switch, a master switch having a plurality of operative positions for controlling the switches, and connections whereby the said switches are opened in one position of the master switch, and moving the master switch through its successive operative positions causes the switches to close in succession responsively to the current taken by the motor.

11. The combination in a system of motor control of a plurality of resistors for controlling the motor, a normally closed electromagnetic switch for controlling each of said resistors, each of said switches having a coil connected across a resistor for governing the closing of the switch and a coil for governing the opening of the switch, a master switch having a plurality of operative positions for controlling the switch, and connections whereby the said switches are opened in one position of the master switch, moving the master switch through its successive operative positions causes the switches to close in succession responsively to the current taken by the motor and moving the master switch in the return direction causes the switches to open in succession.

12. A control system for electric motors comprising a resistor for controlling the motor speed, an electromagnetic switch biased to one position for controlling the resistor, the said switch having two windings energized responsively to the motor current, and connections whereby the first of said windings is temporarily energized to effect the operation of the switch to another position against its bias and the second of said windings is energized to govern the operation of the switch to its biased position.

13. A control system for electric motors comprising a resistor for controlling the motor speed, an electromagnetic switch biased to one position for controlling the resistor, the said switch having two windings energized responsively to the motor current, the first of said windings when energized effects the operation of the switch to another position against its bias and the second of said windings when energized governs the operation of the switch to its biased position, and means whereby the first winding is automatically deenergized to permit the operation of the switch to its biased position and the second winding is automatically deenergized when the switch returns to said biased position.

14. A control system for electric motors comprising a resistor, an electromagnetic switch biased to one position for controlling the resistor, the said switch having one coil temporarily energized to effect the operation of the switch against its bias, and the other coil energized responsively to the voltage drop across the resistor for governing the operation of the switch to its biased position.

15. A control system for electric motors comprising a resistor for controlling the motor speed, an electromagnetic switch biased to one position for controlling the resistor, the said switch having two windings, one of which is energized to effect the operation of the switch to its other position and the other of which is connected across the resistor so as to hold the switch in said other position until the motor current drops to a proper value.

16. A control system for electric motors comprising two resistors, an electromagnetic switch biased to one position for controlling the second resistor, the said switch having one coil connected across the first resistor, and a coil connected across the second resistor whereby the switch is moved against its bias to another position by the effect of both coils and the operation of the switch to its biased position is governed by the coil connected across the second resistor when the first resistor is short-circuited.

17. A control system for electric motors comprising a plurality of resistors, an electromagnetic switch, biased to one position for controlling one of the resistors, the said switch having a coil for effecting the operation of the switch to another position against its bias and a coil for governing the operation of the switch to its biased position, the latter coil being connected across the resistor controlled by the switch and the first mentioned coil being connected across another resistor.

18. A control system for electric motors comprising a plurality of resistors for controlling the motor speed, a plurality of electromagnetic switches biased to the closed position for controlling the resistors, one of the switches having means effective to open the switch against its bias and maintain it there until another of the switches operates, and means energized responsively to the voltage drop across the resistor controlled by the said switch and deenergized in response to the closing of the switch for thereafter holding the switch in its open position until the current drops.

19. A control system for electric motors comprising a starting resistor, a normally closed electromagnetic switch for controlling the resistor, the said switch having two windings energized responsively to the motor current, one of which effects the opening of the switch and the other of which governs the closing of the switch, and means whereby the opening winding is automatically deenergized before the switch closes and the closing winding is deenergized when the switch closes.

20. A control system for electric motors comprising a starting resistor, a normally closed electromagnetic switch for controlling the resistor, the said switch having two windings, one of which is energized to effect the opening of the switch and then automatically deenergized, and the other of which is connected across the resistor so as to hold the switch open until the motor current drops to a proper value.

21. A control system for electric motors comprising a starting resistance, a plurality of normally closed electromagnetic switches operating in succession to control the resistance, windings connected across the resistance for holding the switches open until the motor current drops, and means independent of said windings for causing the opening of the switches.

22. A control system for electric motors comprising a starting resistance, a plurality of normally closed electromagnetic switches operated in succession to control the resistance, windings connected across the resistance for holding the switches open and a winding for opening each switch which is deenergized upon the closing of a preceding switch.

23. A control system for electric motors, comprising a plurality of resistors, normally closed successively operated switches for controlling the resistors, means for automatically opening the switches responsive to closing the motor circuit, the said means effective to hold each switch open until the preceding switch closes, and means responsive to the voltage drop across the resistor controlled by each switch for governing the closing of the switch.

24. A control system for electric motors comprising a plurality of resistors, normally closed successively operated electromagnetic switches for controlling the resistors, each of the switches having means for opening the switch effective to hold the switch open until the preceding switch closes, and means energized responsively to the voltage drop across the resistor controlled by the switch and deenergized in response to the closing of the switch for thereafter holding the switch open until the current has decreased to a proper value.

25. A control system for electric motors comprising a plurality of resistors, normally closed successively operated electromagnetic switches for controlling the resistors, each of the switches having a winding which is temporarily energized to open the switch, and a winding connected across the resistor controlled by the switch for governing the closing of the switch.

26. A control system for electric motors comprising a plurality of resistors, normally closed successively operated electromagnetic switches for controlling the resistors, each of the switches having a winding for opening the switch which is deenergized by the closing of a preceding switch, and a winding for controlling the closing of the switch, which is deenergized in response to the closing of the switch.

27. A control system for electric motors comprising a plurality of resistors, normally closed successively operated electromagnetic switches for controlling the resistors, each of said switches having a winding energized responsively to the voltage drop across a preceding resistor for opening the switch and a winding energized responsively to the voltage drop across the resistor controlled by the switch for holding the switch open until the motor current drops.

28. A control system for electric motors comprising a plurality of resistors, normally closed successively operated electromagnetic switches for controlling the resistors, each of said switches having a winding energized responsively to the closing of the motor circuit for opening the switch and a winding energized responsively to the drop across the resistor controlled by the switch for controlling the closing of the switch.

29. A control system for electric motors comprising a plurality of resistors, normally closed successively operated switches for controlling the resistors, each of the switches having a coil for opening the switch and a coil for governing the closing of the switch, the closing coil being connected across the resistor controlled by the switch and the opening coil being connected across another resistor.

30. A control system for electric motors comprising a plurality of resistors, a plurality of electromagnetic switches for controlling the resistors, a normally closed electromagnetic switch controlling the operation of the resistor switches and connections whereby said switch is automatically opened before the motor circuit is closed and automatically closes to initiate the successive operation of the resistor switches when the motor circuit is closed and the current decreased to a proper value.

31. A control system for electric motors comprising a plurality of resistors, a plurality of normally closed electromagnetic switches having their windings connected across the resistors for controlling the resistors and means whereby the first of said switches is automatically opened prior to the closing of the motor circuit, the remaining switches open responsively to closing the motor circuit, and the switches successively close in accordance with the decreased drop of voltage across the resistors as the motor speeds up.

32. A control system for electric motors comprising a plurality of resistors, a plurality of normally closed electromagnetic switches operating in succession to control the resistors and having their windings connected across the resistors so as to close in accordance with the drop of voltage across the resistors, the first of said switches to operate being opened before the closing of the motor circuit and closed as the motor current drops due to the speeding up of the motor.

33. A control system for electric motors comprising a starting resistance, a normally open electromagnetic switch for cutting out the resistance, a normally closed relay controlling the operation of the electromagnetic switch, and connections whereby the said relay automatically opens before the motor circuit is closed and automatically closes to energize the electromagnetic switch to close when the motor current has decreased to a proper value.

34. A control system for electric motors comprising a starting resistance, a normally open electromagnetic switch for cutting out the resistance, a normally closed electromagnetic relay for controlling the operation of the switch, and connections whereby the relay is energized to automatically open before the motor circuit is closed, and when the motor circuit is closed the relay coil is connected across a section of the resistance so as to automatically close and energize the switch to close when the motor current has decreased to a proper value.

35. A control system for electric motors comprising a starting resistance, a plurality of electromagnetic switches for controlling the resistance, a normally closed electromagnetic relay for controlling the operation of the resistance switches, and connections whereby the relay is automatically opened before the motor circuit is closed, and when the motor circuit is closed the relay winding is connected across a part of the resistance so that the relay will automatically close and initiate the successive operation of the resistance switches when the current has decreased to a proper value.

36. The combination in a system of motor control of a starting resistance, a normally open electromagnetic switch for short-circuiting the resistance, and a normally closed electromagnetic relay for controlling the winding of said switch, the said relay having two cooperating coils for opening the relay and holding it open until the motor current drops, one of said coils being connected across a different part of the resistance than the other.

37. The combination in a control system for reversible motors, of a starting resistance having a plurality of sections, a plurality of successively operated electromagnetic switches for controlling the resistance, two normally closed electromagnetic relays for governing the resistance switches, one for each direction of rotation, and connections whereby the relay windings are connected in series and the relays opened when the motor circuit is opened, closing the motor circuit for operation in either direction connects the winding of one of the relays across a section of the starting resistance so that upon reversal after operation in either direction the resistance switches will not be energized to close until the motor current has been reduced to a proper value.

38. A control system for reversible electric motors comprising a starting resistance, a plurality of electromagnetic switches for controlling the resistance, two normally closed electromagnetic relays for governing the resistance switches, one for each direction of motor operation, and connections whereby the relays are opened before the motor circuit is closed, one of the relays is closed responsively to the voltage drop across the resistance to initiate the successive operation of the resistance switches when the motor circuit is closed for one direction of rotation and the other relay is closed in a similar manner to similarly govern the resistance switches when the motor circuit is closed for operation in the other direction.

39. In a control system, the combination with an electric circuit including a resistor, and a plurality of switches for shunting portions of said resistor, said switches having actuating coils, of means energized responsively to the voltage drop of said resistor for delaying the closing of a switch by preventing the energization of its actuating coil for an interval of time after the previous switch has closed.

40. The combination with an electric motor, a resistor associated therewith and a source of energy, means controlled successively in accordance with the voltage of said source and the voltage drop of said resistor for controlling said resistor, and a switch for closing the circuit of said motor, of a master switch having two positions, in the first of which it effects the closing of said circuit-closing switch and in the second of which it controls said controlling means.

41. The combination with an electric motor having an armature, a resistor in series therewith, a switch for short-circuiting said resistor and having an actuating coil, a relay for said switch having an actuating coil in parallel circuit with said resistor, and a switch for closing the circuit of said motor, of a master switch having two positions, in the first of which it effects the closing of said circuit-closing switch and in the second of which it partly closes the circuit of said switch coil.

42. The combination with a source of energy, an electric motor, a resistor in circuit therewith and means for controlling said resistor, of means successively controlled in accordance with the voltage of said source and with the drop in potential across said resistor for controlling said resistor-controlling means.

43. The combination with a source of energy, an electric motor, a resistor in circuit therewith and means comprising a plurality of switches for controlling said resistor, of means comprising a plurality of relays that are successively controlled in accordance with the voltage of said source and with the drop in potential across said resistor for controlling said switches, and means for initiating the operation of said motor.

44. The combination with a source of energy, an electric motor, a resistor in circuit therewith and means for controlling said resistor, of means successively controlled in accordance with the voltage of said source and with the drop in potential across said resistor for controlling said resistor-controlling means, and means for initiating the operation of said motor and for effecting the successive control of said resistor-controlling means.

45. The combination with an electric motor having an armature and a resistor in series therewith, of a pair of switch members for effecting the short circuiting of successive sections of said resistor, means for controlling said switch members comprising a coil in circuit with said armature and having series characteristics, the second of said switch members to operate having a second coil connected across the section of said resistor that is adapted to be first short circuited.

46. The combination with an electric motor having a resistor associated therewith, of a pair of switches for short circuiting successive sections of said resistor, a pair of relay members, one for each of said switches, having a controlling coil in circuit with said motor and the second of said relay members to operate having a second controlling coil connected between the points of said resistor, and means for maintaining the second of said switches to operate in operative position.

47. The combination with an electric motor and an accelerating switch therefor, of means for controlling the operation of said switch, said means comprising a manually-operable switch and electroresponsive means so controlled by successive actuations of said manually-operable switch as to be successively energized in accordance with line voltage and with the value of the current traversing the motor circuit, respectively, prior to the closing of said accelerating switch.

48. In a controller for direct current motors, in combination, starting and accelerating means and a relay affording control of said accelerating means for delayed action thereof, said relay having two windings coacting to effect a given setting of said relay for subsequent operation of the latter under the control of one winding alone, the other winding being short-circuited and having a transient action affording a time element incident to such operation of said relay.

49. A controller for electric motors comprising an acceleration controlling switch and a relay having contacts for controlling the operation thereof, said relay having a magnetic structure and flux generating and controlling means associated therewith for insuring, when the motor is connected to a source of supply, a quick setting of said contacts for subsequent operation, said means having an inductive action during said subsequent operation which affords a time element for such operation.

50. A controller for electric motors comprising an acceleration controlling switch and a relay affording control of said switch for delayed action thereof, said relay comprising electromagnetic means for effecting a quick setting of the relay for subsequent operation and including a short-circuited winding for causing a time delay for said subsequent operation by reason of the inductive action of said winding.

51. A controller for electric motors comprising an acceleration controlling switch and a normally closed relay for controlling the same, the said relay having two windings which coact to effect opening of the relay, and one of said windings being in a short-circuited condition during the closure of the relay to afford a time element incident to the closure of the relay by reason of the inductive effect thereof.

52. A controller for electric motors comprising accelerating means and a normally closed relay affording control of said means for delayed action thereof, said relay having two windings coacting to effect the opening and regulate the subsequent closure of the relay, one of said windings being energized to regulate the closure of the relay in accordance with the value of the motor current and the other of said windings being in a short-circuited condition during closure of the relay to influence the value of motor current at which the first winding permits the relay to close.

53. A controller for electric motors comprising accelerating means and a normally closed relay affording control of said accelerating means for delayed action thereof, said relay having two windings coacting to effect the opening of the relay and regulate the subsequent closure thereof, one of said windings being connected to be energized in accordance with the motor current and the other of said windings cooperating with the first winding to cause said relay to open at a lower value of motor current than the value of motor current at which the relay closes.

54. In combination in a system of control for an electric motor, a motor circuit, a resistor having a plurality of sections included in the motor circuit, a plurality of electromagnetic switches interconnected to operate in a definite succession to effect the successive shunting of sections of said resistor, the said switches having each a controlling electromagnet with a winding thereof interconnected with the motor circuit to have a transient effect which, after the closure of a preceding switch, introduces a substantial time interval delay in the closure of the switch associated with the said winding.

55. In combination, an electric motor, a resistor connected with the motor to regulate the current taken thereby, a plurality of electromagnetic switches arranged to operate in a definite succession to effect the successive shunting of portions of said resistor, each of said switches having a coil connected in multiple relation with said resistor for holding the switch in the open position, the said connections requiring the said successive closing of the switches with a substantial time interval delay between the closing of certain of said switches and the closing of a preceding switch of the succession by reason of the shunting of the coil of a succeeding switch by the closing of the preceding switch.

56. In combination, an electric motor, a resistor connected therewith for limiting the current taken thereby, a plurality of electromagnetic switches arranged to close in a definite succession to effect the successive shunting of portions of said resistor, the said switches having controlling coils connected across different portions of said resistor to hold the switches in the open position, the said connections being such that the closing of a switch also effects the shunting of the controlling coil of the next switch of the succession to permit the closing of said next switch after a definite and substantial interval of time.

57. A control system for electric motors comprising a plurality of successively operated electromagnetic switches for controlling the motor, a resistor shunted by one of said switches, and a winding for governing the closure of said resistor switch, the said winding having an associated magnetic structure and being connected to be shunted by the closure of a preceding switch of said succession to thereby delay the closure of said resistor switch for an interval of time after the closure of said preceding switch determined by the inductive action of said winding and associated magnetic structure.

58. A control system for electric motors comprising two resistors connected with the motor to regulate the speed thereof, a switch for shunting the first resistor, an electromagnetic switch for effecting the shunting of the second resistor, the said electromagnetic switch having a switch member and a winding connected to be energized to open the switch member and hold the same in the open position until the first resistor switch closes and to be then shunted by the closing of the first resistor switch, the inductive effect of the winding of said switch upon the short circuiting thereof by the first resistor switch providing a time interval between the shunting of the first and second resistors.

59. A control system for electric motors comprising a resistor having a plurality of sections, separate switch contacts for effecting the successive shunting of said sections, an electromagnet for governing each of certain of said contacts, a winding of each of said electromagnets being connected in multiple relation with the preceding resistor section of the succession to apply an opening force to the contacts controlled by the electromagnet and to provide a time interval in the closing of said contacts by the inductive effect of the winding when the preceding section of resistor and said winding are shunted.

60. In a controller for electric motors, in combination, a plurality of contactors arranged to be successively operated to effect control of said motor, a plurality of resistors arranged to be shunted by certain of said contactors, a set of normally closed relay contacts for controlling each of said resistor contactors, magnetically controlled means for opening said contacts, and means comprising a winding for each set of said contacts for obtaining a desired sequence of operation of the resistor contactors, each of said windings being connected to be shunted by the closing of a preceding contactor of the succession to introduce time intervals between the closing of the contactors by reason of the inductive effect of said windings.

61. In combination, an electric motor having a resistor associated therewith, a pair of switches for shunting successive sections of said resistor, a pair of relay members, one for each of said switches, having a controlling coil in circuit with said motor, the second of said relay members to operate having a second coil connected with the section of the resistor to be first shunted so as to be shunted with the shunting of said first section.

62. The combination in a system of motor control, of a starting resistor, a normally open electromagnetic switch for short-circuiting the resistor, and a normally closed electromagnetic relay for controlling the winding of said switch, the said relay having two windings, one of said windings being provided for opening the relay and the other of said windings being energized in accordance with the value of the motor current and provided for governing the closing of the relay, and means for shunting the opening winding to give the control of the relay to the closing winding.

63. In combination, an electric motor, a resistor connected with the motor for controlling the same, a plurality of electromagnetic switches for shunting sections of said resistor in a predetermined sequence, a plurality of relays for controlling said switches, said relays having energizing means controlled responsively to the motor current and in accordance with the position of the preceding switch to operate, the energizing means of said relays being interconnected to insure operation of said switches in said sequence.

64. In combination, an electric motor, a speed regulating resistor connected with the motor, a plurality of switches for shunting portions of said resistor, and a plurality of relays interconnected to close in a predetermined succession to effect the successive closing of said switches, certain of said relays having each a coil connected in multiple relation with said resistor for holding the associated relay in the open position until after the closing of a preceding switch of said succession.

65. In combination, an electric motor, a source of energy therefor, a resistor connected with the motor for limiting the motor current, a contactor for shunting the said resistor, a reversing controller including a pair of directional switches for effecting the connection of said motor to said source for forward and reverse operation, relay means under the control of said controller for governing the energization of said contactor, and connections through which the said relay means is energized from said source when said controller is in a position to effect the disconnection of the motor from the source and said directional switches are open, and the relay means is energized responsively to the voltage drop of the resistor when the controller is moved to a position to effect a selective operation of said directional switches and the connection of the motor to the source.

66. The combination with an electric motor having a resistor associated therewith, and a switch for controlling said resistor having an energizing coil, of means for normally maintaining said coil energized to maintain said switch open and means for connecting said coil across said resistor upon the closing of the circuit of said motor.

67. The combination with an electric motor having an armature, a resistor in series therewith, a source of energy for said motor, a plurality of switches for short-circuiting said resistor and a relay for each of said switches, said relays having energizing coils controlled in accordance with the voltage drop of said resistor, of means for maintaining the coil of the first of said relays to operate energized from said source when said motor is disconnected from said source.

68. An electrical control system comprising a resistor, connections forming a shunt circuit with respect to said resistor, said connections including an electromagnetic switch biased to a predetermined position to effect the closing of said shunt circuit, a winding electrically connected with said resistor so as to operate said switch to open said shunt circuit when said resistor is energized, and means for short circuiting said winding to thereby permit the operation of said switch to close said shunt circuit after an interval of time determined by the inductive action of said winding under short circuit conditions.

69. An electrical control system comprising a resistor, a switch biased to a predetermined position to effect the shunting of a section of said resistor, a winding for said switch electrically connected across another section of said resistor so as to be energized to operate said switch to another position when said resistor is energized and thereby open said shunt circuit, and means for short circuiting said winding to permit the operation of said switch to shunt said resistor after an interval of time determined by the inductive effect of said winding under short circuit conditions.

In witness whereof, we have hereunto set our hands this 24th day of January, 1920.

EUGENE R. CARICHOFF.
BENJAMIN W. JONES.